(12) United States Patent
Amor et al.

(10) Patent No.: US 10,733,186 B2
(45) Date of Patent: Aug. 4, 2020

(54) N-WAY HASH JOIN

(71) Applicant: Oracle International Corporation, Redwood Shores, CA (US)

(72) Inventors: Angela Amor, Menlo Park, CA (US); Andrew Witkowski, Foster City, CA (US); Srikanth Bondalapati, Belmont, CA (US); Sankar Subramanian, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 853 days.

(21) Appl. No.: 15/266,751

(22) Filed: Sep. 15, 2016

(65) Prior Publication Data

US 2018/0075101 A1 Mar. 15, 2018

(51) Int. Cl.
*G06F 16/2453* (2019.01)
*G06F 16/22* (2019.01)
*G06F 16/2455* (2019.01)

(52) U.S. Cl.
CPC .... *G06F 16/24544* (2019.01); *G06F 16/2255* (2019.01); *G06F 16/24553* (2019.01); *G06F 16/24554* (2019.01)

(58) Field of Classification Search
CPC .......... G06F 16/2255; G06F 16/24544; G06F 16/24553; G06F 16/24554
See application file for complete search history.

(56) References Cited

U.S. PATENT DOCUMENTS

| 9,740,735 | B2* | 8/2017 | Ramsey | G06F 16/2448 |
| 2006/0167865 | A1* | 7/2006 | Andrei | G06F 16/24544 |
| 2008/0215556 | A1* | 9/2008 | Surna | G06F 16/245 |
| 2009/0228514 | A1* | 9/2009 | Liu | G06F 16/8365 |
| 2012/0246146 | A1* | 9/2012 | Lee | G06F 16/2456 707/714 |
| 2014/0006379 | A1* | 1/2014 | Arndt | G06F 16/24554 707/714 |
| 2017/0286485 | A1* | 10/2017 | Chandramouli | G06F 16/245 |

OTHER PUBLICATIONS

Henderson, Michael, "Multi-Way Hash Join Effectiveness", http://people.ok.ubc.ca/rlawrence/research/Students/MH_13_Thesis.pdf, retrieved on Aug. 21, 2017, 62 pages.
Alfons Kemper et al., "Geneta;ized Hash Teams for Join and Group-by", Proceedings of the 25th VLDB Conference, dated Sep. 7, 1999, 12 pages.

* cited by examiner

*Primary Examiner* — Mark D Featherstone
*Assistant Examiner* — Navneet Gmahl
(74) *Attorney, Agent, or Firm* — Hickman Palermo Becker Bingham LLP (57) ABSTRACT

Techniques are described herein for processing queries comprising joins specifying a plurality of tables. The techniques involve partitioning the tables by assigning rows to partitions. One or more partition maps may be generated to indicate the partitions. Subsequent tables may be partitioned based on the generated partition maps. The partitions may be used to determine results for the joins.

22 Claims, 9 Drawing Sheets

100

| C1 | C2 |
|---|---|
| 1 | 2 |
| 2 | 3 |
| 3 | 4 |
| 4 | 1 |

102

| PARTITION | ROW |
|---|---|
| P1 | (1,2) |
| P2 | (2,3) |
| P3 | (3,4) |
| P4 | (4,1) |

104

| C2 | PARTITION |
|---|---|
| 1 | P4 |
| 2 | P1 |
| 3 | P2 |
| 4 | P3 |

120

| C3 | C4 |
|---|---|
| 1 | 3 |
| 2 | 4 |
| 3 | 1 |
| 4 | 2 |

122

| PARTITION | ROW |
|---|---|
| P1 | (2,4) |
| P2 | (3,1) |
| P3 | (4,2) |
| P4 | (1,3) |

TABLE e1

| C1 (from_id) | C2 (to_id) |
|---|---|
| 1 | 2 |
| 2 | 3 |
| 3 | 4 |
| 4 | 1 |
| 3 | 2 |

510

| PARTITION | |
|---|---|
| P1 | (4,1) |
| P2 | (1,2) (3,2) |
| P3 | (2,3) |
| P4 | (3,4) |

TABLE e2

| C1 (from_id) | C2 (to_id) |
|---|---|
| 1 | 2 |
| 2 | 3 |
| 3 | 4 |
| 4 | 1 |
| 3 | 2 |

520

| PARTITION | |
|---|---|
| P1 | (1,2) |
| P2 | (2,3) |
| P3 | (3,4) (3,2) |
| P4 | (4,1) |

FIG. 5

PARTITION MAP PM1

| C1<br>(from_id) | PARTITION |
|---|---|
| 1 | P2 |
| 2 | P3 |
| 3 | P4, P2 |
| 4 | P1 |

602 → (points to row 1)

PARTITION MAP PM2

| C2<br>(to_id) | PARTITION |
|---|---|
| 2 | P1, P3 |
| 3 | P2 |
| 4 | P3 |
| 1 | P4 |

FIG. 6

TABLE e3

| C1 (from_id) | C2 (to_id) |
|---|---|
| 1 | 2 |
| 2 | 3 |
| 3 | 4 |
| 4 | 1 |
| 3 | 2 |

710

| PARTITION | |
|---|---|
| P1 | (2,3) |
| P2 | (3,4) (3,2) |
| P3 | (4,1) (2,3) |
| P4 | (1,2) |

PARTITION MAP PM3

| C2 (to_id) | PARTITION |
|---|---|
| 1 | P3 |
| 2 | P2, P4 |
| 3 | P1, P3 |
| 4 | P2 |

FIG. 7

TABLE e4

| C1 (from_id) | C2 (to_id) | PARTITION FROM PM3 | PARTITION FROM PM1 |
|---|---|---|---|
| 1 | 2 | P3 | P3 |
| 2 | 3 | P2, P4 | P2, P4 |
| 3 | 4 | P1, P3 | P1 |
| 4 | 1 | P2 | P2 |
| 3 | 2 | P1 | P2, P4 |

810

| PARTITION | |
|---|---|
| P1 | (3,4) |
| P2 | (2,3) (4,1) |
| P3 | (1,2) |
| P4 | (2,3) |

N-WAY HASH JOIN

FIELD OF THE INVENTION

The present invention relates to query processing techniques, and more specifically, to computer-implemented techniques for processing multi-way hash joins.

BACKGROUND

Database servers commonly receive commands that require the performance of a class of operations known as "join operations." A join operation is used to combine multiple tables, so data from those tables may be selected in a query. A query that joins two tables specifies how the tables are joined using one or more join criteria. Generally speaking, a join operation comprises merging each row in a first table with each row of a second table that matches the join criteria. For example, a query may specify that rows in the first table only join with rows in a second table when rows in the first table have a value in a particular column that matches the value in a particular column of rows in the second table. The corresponding columns that contain the values that determine which rows of the first table join with which rows of the second table are referred to as the "join keys."

Database servers may rely on an algorithm known as a "hash join" to efficiently perform join operations. The "hash join" operation typically comprises two phases. In the first phase, known as the "build phase," the database server generates a hash table by hashing each row of the first table according to a hash function on the join key. In the second phase, known as the "probe phase," the database server iteratively scans through each row of the second table. For each row in the second table, the database server uses the hash function and the hash table to identify rows in the first table with equivalent join key values. When matching rows are identified, the rows are merged and added to the result set for the join operation.

A hash join operation merges two tables at a time. For a query that specifies a join of more than two tables, a query optimizer may determine an order for joining pairs of tables. Each pair of tables may be merged with their respective join keys, using a hash join, to produce intermediate results. The intermediate results may be merged with other tables or other intermediate results to produce the query results. However, if the tables in the join operation are relatively large, the database server may be unable to fit an intermediate join result in volatile memory. In that situation, a portion or all of the intermediate join result must be written to a storage disk. Reading and writing from a disk takes longer than reading and writing results only from volatile memory.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described for processing multi-way joins in a query using a multi-way hash join. According to various embodiments, a database server instance identifies a multi-way join in a received query. The database server instance assigns rows of each table specified in the multi-way join to one or more partitions, based on either a hash function or one or more partition maps.

For tables that are partitioned using a hash function, rows are assigned to partitions according to a hash function on a partition key. One or more partition maps may be generated for the table, based on the partitions. If a table is partitioned according to a join column, a partition map indicates, for a second column in the table, which partitions have rows that contain each of the values for that column. The second column may be specified as a join key in a subsequent join criteria in the multi-way join.

Figure 1:
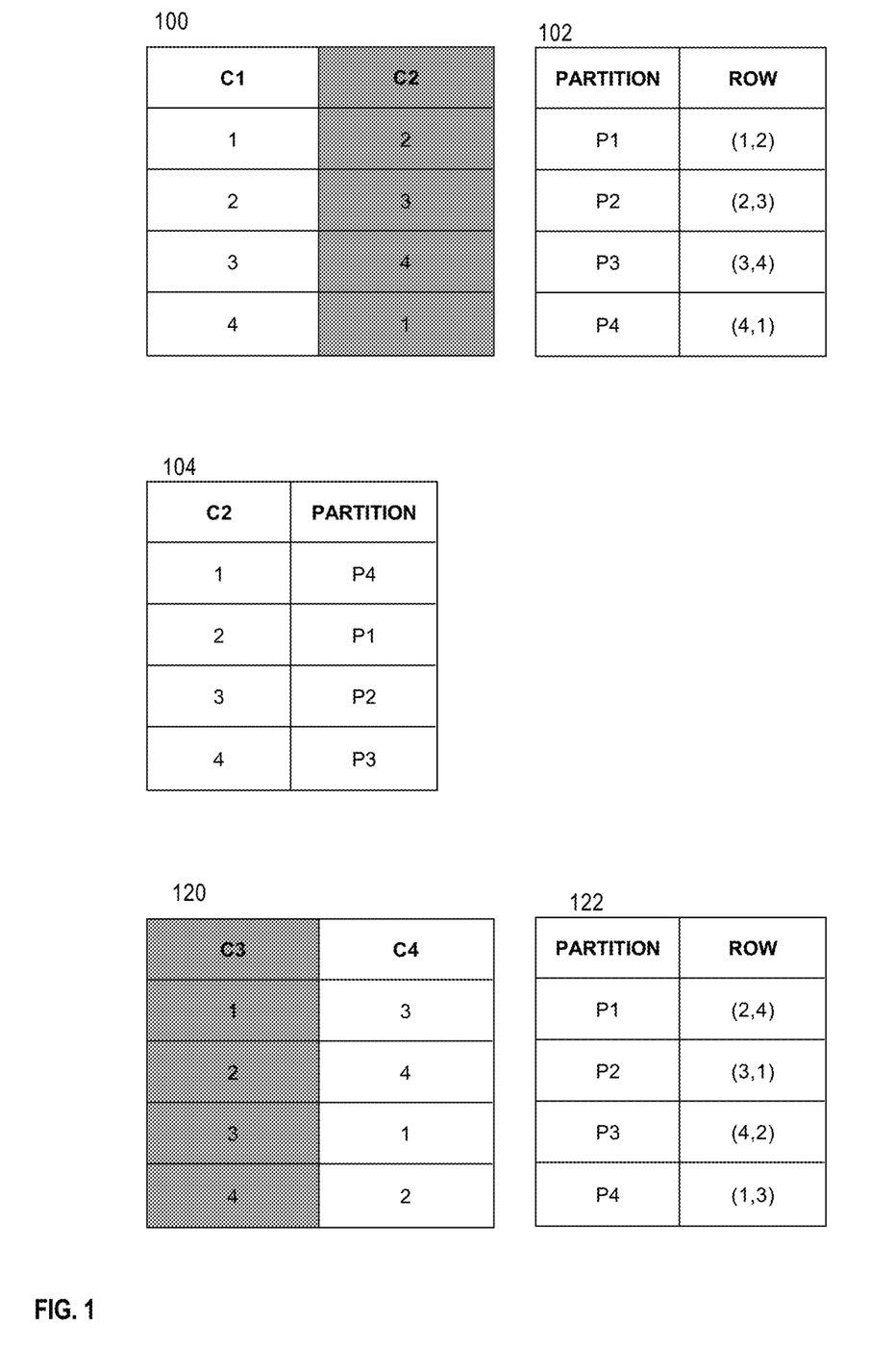
FIG. 1 is a block diagram illustrating an example partition map.

Referring to FIG. 1, it illustrates a table whose rows have been assigned to partitions. Table T100 has two columns, C1 and C2. Assume table 100 has been partitioned based on column C1 into the partitions indicated at 102. Partition map 104 is generated based on partitions 102 and column C2. For example, row (1,2) was assigned to partition 1, so partition map 104 indicates that C2 value 2 can be found at partition 1.

Tables can be partitioned using partition maps, by assigning rows to partitions based on partition maps created for previously partitioned tables. If a previously partitioned table is joined with a second table by a join criteria, then the second table is partitioned using the partition map created for the previously partitioned table. The value of the partition key in a row may be used to index into the partition map and determine which partitions were mapped to that value.

Referring to FIG. 1, assume table 120 is joined with table 100 with the join "table100.C2=table120.C3." The values of table 120 in column C3 are used to index partition map 104 of table 100. For example, for row (1,3) of table 120, the value 1 is used to index partition map 104. Partition map 104 indicates that a value of 1 is found in partition 4, so row (1,3)

is also assigned to partition 4, as indicated at 122. As another example, for row (2,4) of table 120, the value 2 is used to index partition map 104. Partition map 104 indicates that a value of 2 is found in partition 1. Thus, row (2,4) is assigned to partition 1.

By assigning rows of each table based on how other tables were partitioned, rows that are likely to satisfy the join query are assigned to the same partition.

System Overview

Figure 2:
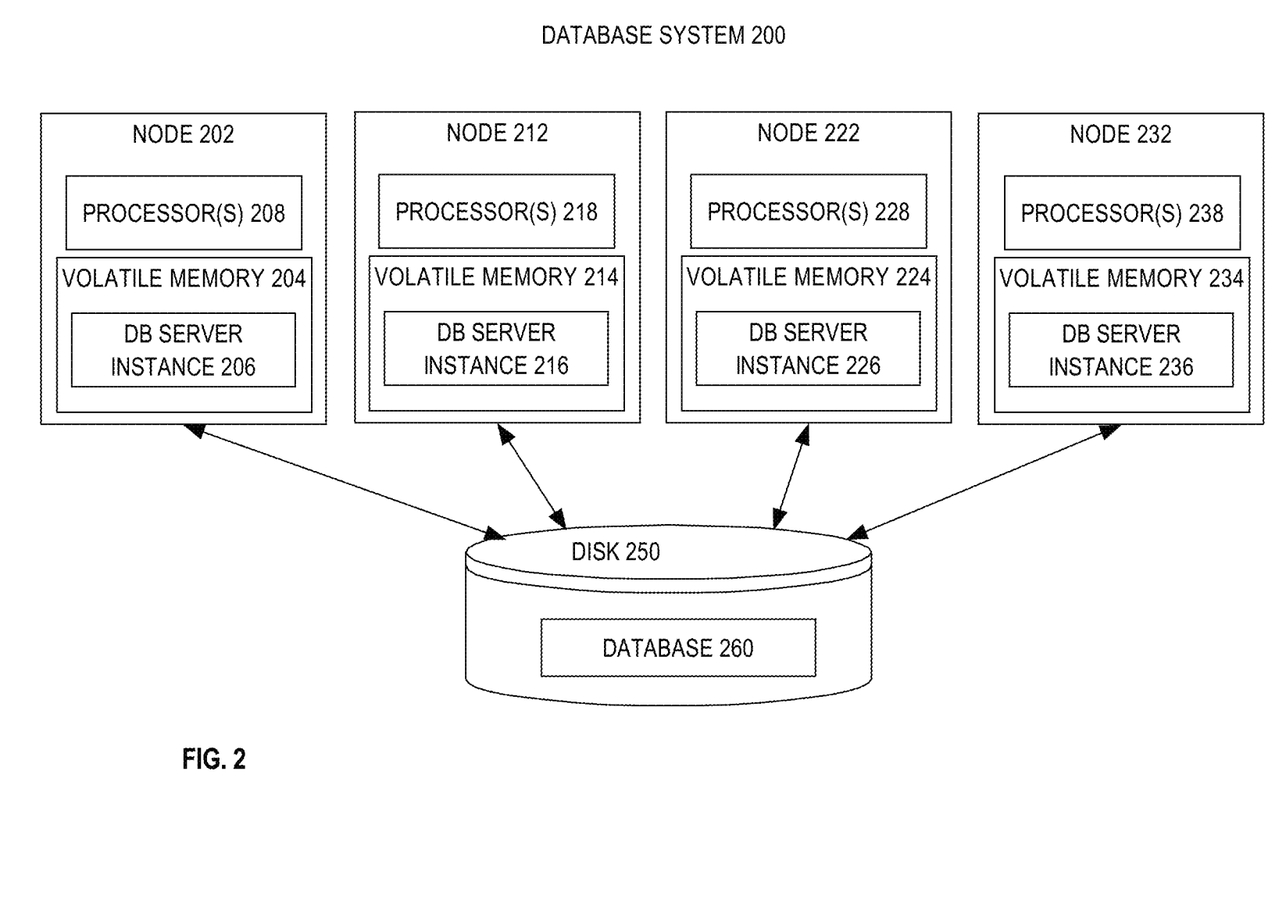
FIG. 2 is a block diagram illustrating a system architecture of a database cluster.

FIG. 2 depicts a multi-node database system on which an embodiment may be implemented. In the embodiment illustrated in FIG. 2, system 200 comprises four nodes, 202, 212, 222, and 232. Although four nodes are shown in the present illustration, in other embodiments, system 200 may comprise fewer or more nodes.

Each of nodes 202, 212, 222, and 232 have access to the same database 260. For the purpose of illustration, database 260 is shown as stored on a single shared disk 250, but in alternative embodiments may be spread across multiple disks to which each of nodes 202, 212, 222, and 232 have access.

Nodes 202, 212, 222, and 232 respectively have one or more processors 208, 218, 228, and 238, and local volatile memory 204, 214, 224, and 234. In addition, nodes 202, 212, 222, and 232 are respectively executing database server instances 206, 216, 226, and 236. While in the illustrated embodiment each node is executing a single database server instance, in alternative embodiments, a single node may execute more than one database server instance.

Multi-Way Joins

A database query may include a type of join operation known as a "multi-way join." A multi-way join is a join operation that joins a plurality of tables. A query with a multi-way join may specify a plurality of tables to be joined together, and a plurality of join criteria for joining the plurality of tables. Each join criteria may include a pair of tables and join keys for merging the pair of tables. The join criteria may also include one or more join conditions.

In an embodiment, each join criteria in the multi-way join connects a table with the next table in the multi-way join. For example, assume a database includes tables T1, T2, and T3. A multi-way join query that joins table T1, T2, and T3 may specify three join criteria: the first joining T1 and T2, the second joining T2 and T3, and the third joining T3 and T1. Thus, each join criteria has a table in common with the join criteria that appears before or after it in the query.

The plurality of tables specified in a multi-way join do not need to all be distinct tables. The multi-way join may comprise one or more self-joins. A "self-join" merges rows of a table with other rows in the same table. For example, a table T4 with employee information may include columns "employee_id" and "supervisor_id." A self-join of table T4 may be used to determine which employees are supervisors of other employees. The self-join may specify that rows of T4 should be merged when the value of "employee_id" for a row equals the value of "supervisor_id" of a second row in T4.

For the purpose of illustrating a clear example, instances of the same table may be referred to herein as different tables. For example, aliases such as e1 and e2 are described herein as being two tables, when they may be instances of the same table. An "alias" is an alternate name used to refer to a table within a query.

Rather than using successive hash joins to process a multi-way join, a multi-way join may be processed using a "multi-way hash join." A multi-way hash join is a hash join that hashes all the tables in the multi-way join and then combines them to output the result, rather than combining only two tables in a single operation. As explained in further detail below, the multi-way hash join partitions each table into join partitions, which may be stored in memory.

Each database server instance 206, 216, 226, and 236 can receive a query and determine a query execution plan. The database server instance may receive a query and determine the query comprises multiple join criteria, each of which can be processed using hash joins. The database server instance may select a multi-way hash join, rather than a series of hash joins, to process the multiple join criteria.

In an embodiment, a multi-way hash join may be used to execute a query. The received query may comprise a plurality of tables connected by join criteria, wherein each join criteria connects a table with the next table in a multi-way join, as well as other join predicates or join criteria that do not connect a table with another table in the multi-way join. The database server instance may iteratively add each join criteria in the multi-way join to a list of join criteria to be processed with a multi-way hash join.

Join Partitions

In order to join a plurality of tables using a multi-way hash join, each table in the plurality of tables may be partitioned into one or more groups, referred to as "join partitions." The join partitions may be stored in the memory of a node, such as local memory 204, 214, 224, and 234, or on a disk, such as shared disk 250. In an embodiment, join partitions are stored primarily in local volatile memory of a node. If the space allocated in memory is insufficient to hold data for a join partition, some or all of the join partition may be stored on disk. In an embodiment, if there is insufficient memory to store all of the data for a join partition, then the entire join partition is moved to disk.

In some embodiments, the number of partitions used for the multi-way hash join is based on cardinality of the multi-way join. The database system calculates an estimated cardinality for the multi-way join. The cardinality for a join indicates the number of rows in the result. The estimated cardinality for the multi-way join may be based on the cardinality for each join comprising the multi-way join. In an embodiment, the number of partitions is equal to the cardinality of the multi-way join.

In an embodiment, rows of each table are assigned to one or more join partitions. If a row is assigned to a particular join partition, then the particular join partition may comprise a copy of the row. A row may be assigned to a partition based on the values in a corresponding column, referred to as a "partition key." When a join criteria joins two tables on join keys, the respective join key for each table may be used as the partition key for partitioning each table. For example, for the join criteria "T1.ColA=T2.ColB," the join keys are ColA for table T1 and ColB for table T2. ColA may be used as the partition key for partitioning table T1, and ColB may be used as the partition key for partitioning table T2.

Rows in a table may be assigned to partitions using a hash function. The hash function is applied to the value in the partition key column for a row. Based on the result of the hash function, the row is assigned to a corresponding partition. The same hash function may be applied to the respective partition key for each table in the multi-way join. As described in further detail below, a row may be assigned to more than one partition based on how rows in other tables were assigned to partitions. In an embodiment, join partitions are stored in local memory of a node. If a row is assigned to more than one partition, then it may be stored multiple times in memory, for each partition it is assigned to.

In an embodiment, the first two tables of the multi-way join are partitioned using a hash function. The remaining tables may be partitioned based on a partition map, as explained in further detail below.

Partition Maps

If a table will join with other tables in subsequent joins, then a partition map is created for the table when it is partitioned, based on the subsequent join criteria. A partition map indicates, for a table, which one or more partitions each row of the table belongs to. The partition map for a table may be generated based on the partitions that the rows of the table have been assigned to. If rows of a table are assigned to partitions using a first column as the partition key, the partition map may be created based on the values in a second column and the partition assignments of the rows in the table. The second column used to generate the partition map may be a column that is specified as a join key for the table in a subsequent join criteria that includes the table. If a table has multiple columns that are used as join keys within a multi-way join, then a partition map may be generated for each column.

An entry in a partition map indicates, for a value of the second column, the partition(s) the corresponding row(s) belong to based on the second column. In an embodiment, a hash function is applied to the values in the second column to create the corresponding entry in the partition map.

A table may be partitioned based on one or more partition maps previously created when partitioning other tables in the multi-way join. Assume a join criteria connects a first table and a second table on a join key, and the first table was partitioned based on a different join criteria and a different join key. A partition map was created for the first table based on the join key, corresponding to which partitions rows of the first table were assigned to. Rows of the second table may be partitioned with the join key as the partition key and using the partition map. The value in the partition key column for a row is used to look up a corresponding entry in the partition map. If the value is found in the partition map, the row is assigned to the partition(s) indicated in the corresponding entry of the partition map. If the value is not found in the partition map, then the row does not match with any row in the first table. That row may be discarded and not assigned to a partition.

Since rows are assigned to partitions based on join criteria and the way other tables were partitioned, a partition for a table contains rows of that table that could potentially be merged with rows of other tables assigned to the same partition. Merging tables based on partitions reduces the number of comparisons that would need to be made for rows of tables that are being joined.

In an embodiment, the first two tables specified in a multi-way join query are partitioned using a hash function. The remaining tables in the multi-way join query are partitioned based on partition maps.

Process Overview

Figure 3:
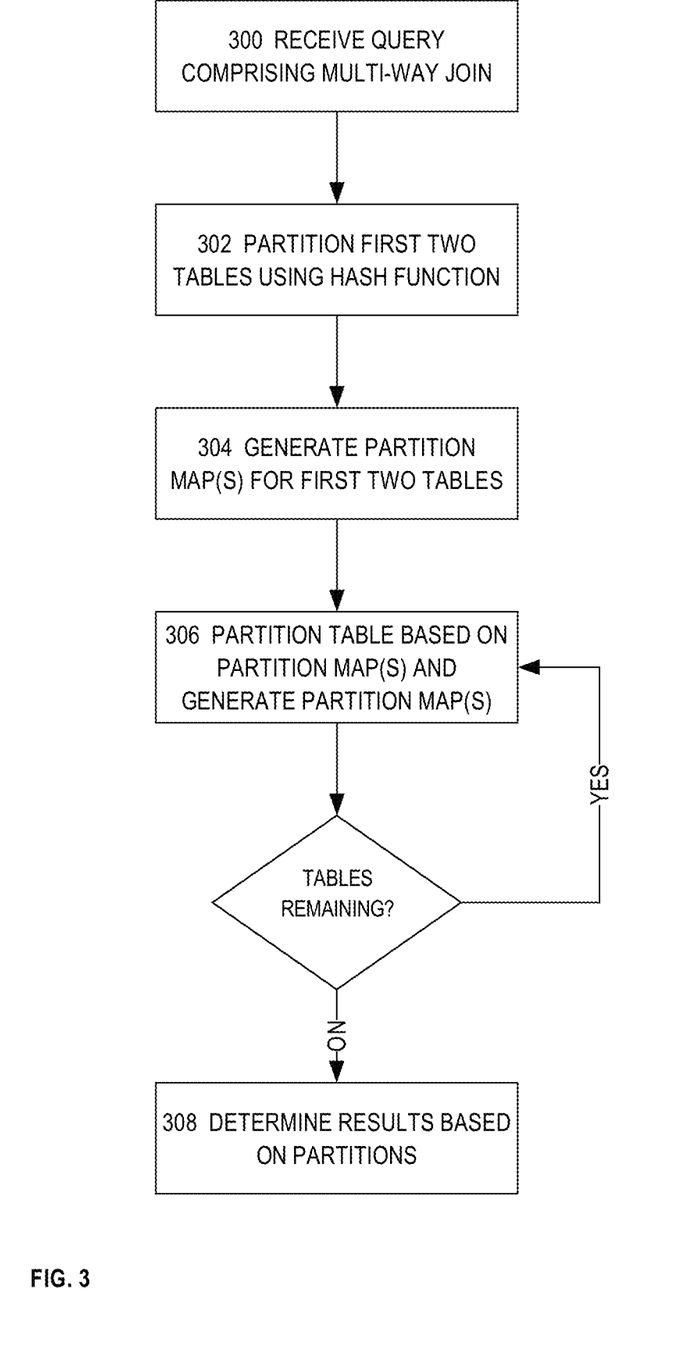
FIG. 3 is a flowchart illustrating steps for processing a multi-way join.

FIG. 3 is a block diagram illustrating the steps performed by a database system to perform a multi-way hash join, according to an embodiment.

At step 300, a database server instance receives a query comprising a multi-way join. The database server instance may parse the query to determine a portion of the query that comprises the multi-way join, and select an execution plan that uses a multi-way hash join.

Figure 4:
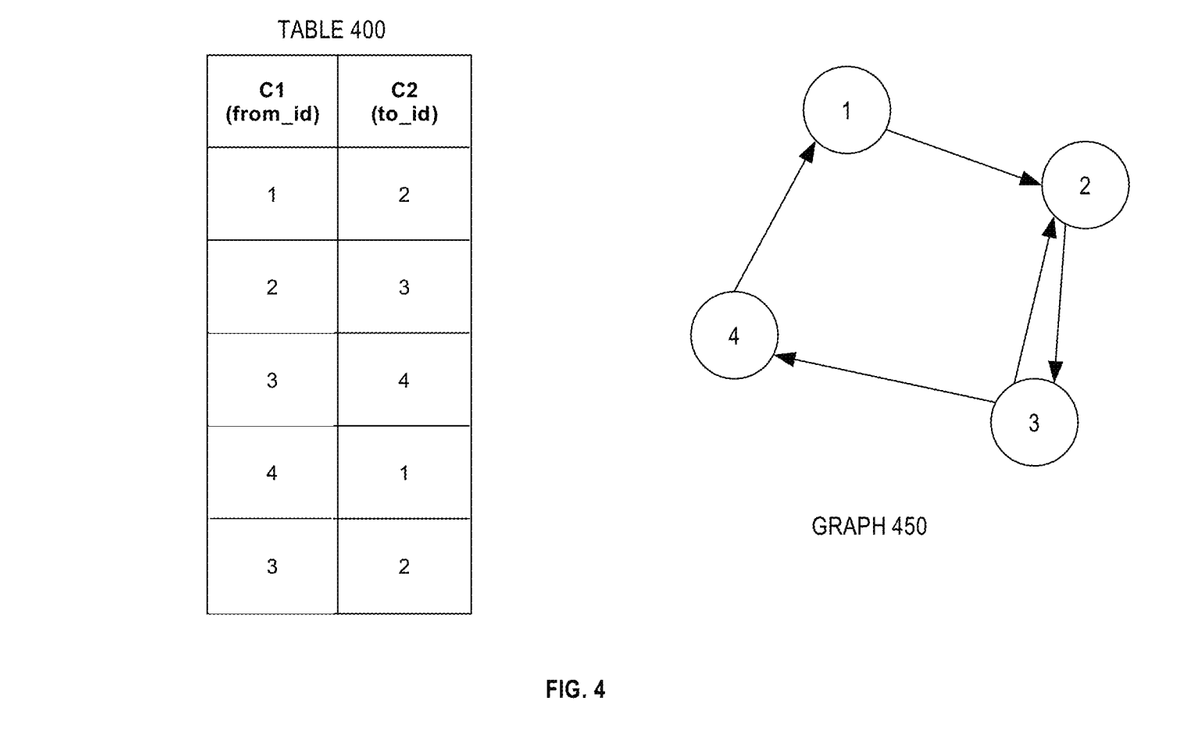
FIG. 4 is a block diagram illustrating an example database table.

Referring to FIG. 4, database 260 comprises a table 400. Table 400 is referred to as an "edge" table. Edge table 400 represents the edges illustrated in directed graph 450, with columns for "from_id" (table400.C1) and "to_id" (table400.C2). "From_id" indicates the starting point of an edge in directed graph 450 and "to_id" indicates the end point of the edge.

Assume database server instance 206 at node 202 in system 200 receives the following query for table 400 that includes a multi-way join:

SELECT count(*) FROM Table400 e1, Table400 e2, Table400 e3, Table400 e4
WHERE e1.C2=e2.C1
AND e2.C2=e3.C1
AND e3.C2=e4.C1
AND e4.C2=e1.C1

The query uses aliases to refer to each reference to table 400. In the present example, aliases e1, e2, e3, and e4 are used to refer to table 400. Thus, the query comprises a multi-way join specifying four self-joins of table 400 with four join criteria:

Tables e1 and e2, with join keys on the "to_id" column of e1 and the "from_id" column of e2;
Tables e2 and e3, with join keys on the "to_id" column of e2 and the "from_id" column of e3;
Tables e3 and e4, with join keys on the "to_id" column of e3 and the "from_id" column of e4; and
Tables e4 and e1, with join keys of the "to_id" column of e4 and the "from_id" column of e1.

At step 302, database server instance 206 partitions the first two tables involved in a join of the multi-way join using a hash function. For the purpose of illustrating a clear example, assume four partitions are used to partition the tables for the received query. Applying the hash function to a value of "1" results in assigning the row to partition p1, a value of "2" to partition p2, a value of "3" to partition p3, and a value of "4" to partition p4.

Figure 5:
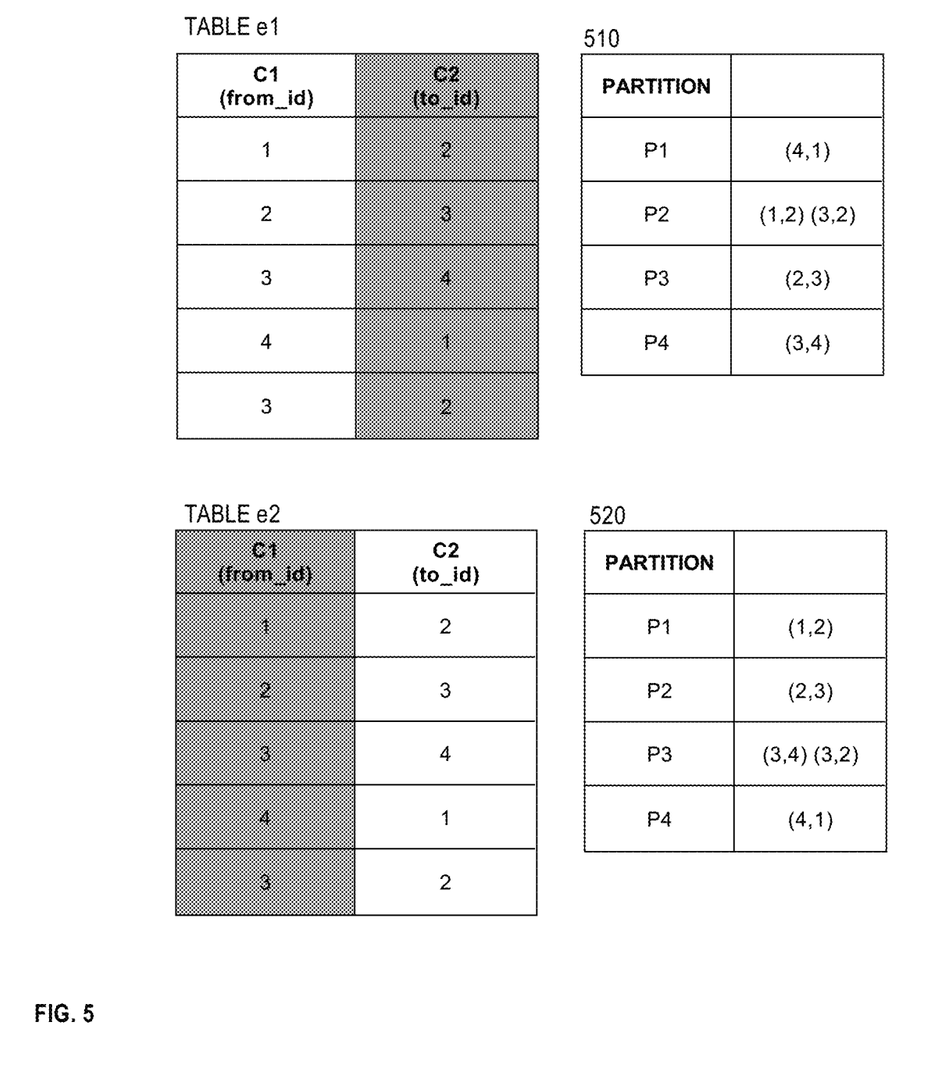
FIG. 5 is a block diagram illustrating the partitions for two tables.

The first join criteria is "e1.C2=e2.C1", so the first two tables in the multi-way join are table e1 and table e2. Referring to FIG. 5, it illustrates partitions for table e1 and e2. For the purpose of illustration, assume the join key corresponding to each table is used as the partition key for partitioning the respective table.

The join key for table e1 is the "to_id" column (e1.C2), so the "to_id" column is used as the partition key for partitioning table e1. The hash function is applied to the value in the "to_id" column of each row in table e1 to determine which partition the row is assigned to.

Row (1,2) has a value of 2 in the "to_id" column, so row (1,2) is assigned to partition p2. Row (2,3) has a value of 3 in the "to_id" column, so row (2,3) is assigned to partition p3. Row (3,4) has a value of 4 in the "to_id" column, so row (3,4) is assigned to partition p4. Row (4,1) has a value of 1 in the "to_id" column, so row (4,1) is assigned to partition p1. Row (3,2) has a value of 2 in the "to_id" column, so row (3,2) is also assigned to partition p2. As indicated in table 510, the partitions for table e1 contain the following rows:

P1: (4,1)
P2: (1,2), (3,2)
P3: (2,3)
P4: (3,4)

The hash function is also applied to table e2, using "from_id" as the partition key to determine which partition each row of table e2 is assigned to. Row (1,2) has a value of 1 in the "from_id" column, so row (1,2) is assigned to partition p1. Row (2,3) has a value of 2 in the "from_id" column, so row (2,3) is assigned to partition p2. Row (3,4) has a value of 3 in the "from_id" column, so row (3,4) is assigned to partition p3. Row (4,1) has a value of 4 in the "from_id" column, so row (4,1) is assigned to partition p4. Row (3,2) has a value of 3 in the "from_id" column, so row (3,2) is assigned to partition p3. As indicated in table 520, the partitions for table e2 contain the following rows:

P1: (1,2)
P2: (2,3)
P3: (3,4), (3,2)
P4: (4,1)

At step 304, database server instance 106 generates partition maps based on the partitions for the first two tables.

Figure 6:
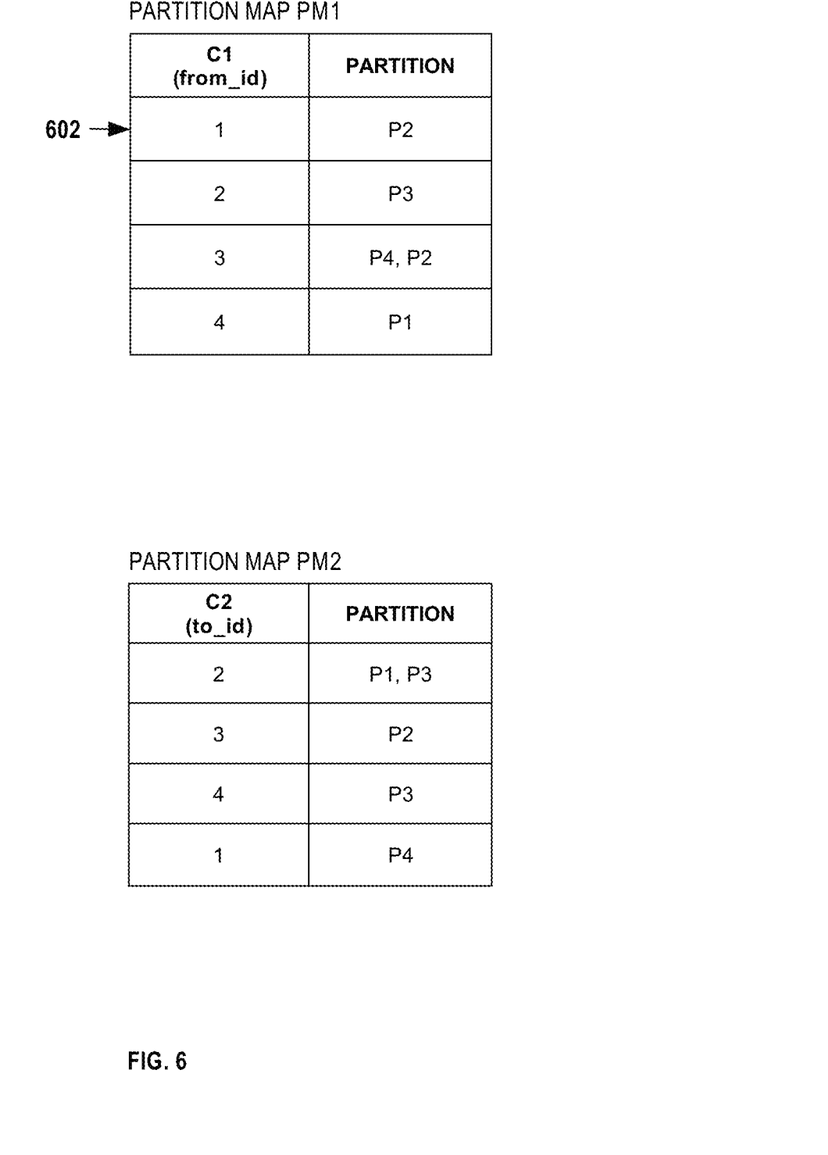
FIG. 6 is a block diagram illustrating the partition maps for two tables.

Referring to FIG. 6, it illustrates partition maps for tables e1 and e2. Partition map pm1 is a partition map for table e1 and partition map pm2 is a partition map for table e2. Table e1 was partitioned using the "to_id" column as a partition key. Partition map pm1 is generated based on the "from_id" column, because a subsequent join criteria (e4.C2=e1.C1) joins a table with table e1 using "from_id" as the join key. Partition map pm1 indicates, for each value of "from_id," the partitions that a corresponding row, containing that column value, was assigned to.

In the present example, for row (1,2) of table e1, the "from_id" value is 1 and row (1,2) was assigned to partition 2. As indicated by row 602 in FIG. 6, the row in the partition map pm1 indicates that rows with "from_id" value of 1 were assigned to partition p2.

If multiple rows with the same column value were assigned to different partitions, then each partition is indicated in the partition map. For example, a "from_id" value of 3 corresponds to two rows: row (3,4) and row (3,2). Row (3,4) was assigned to partition p4 and row (3,2) was assigned to partition p2, so partition map pm1 indicates that rows with a "from_id" value of 3 were assigned to partitions p2 and p4.

Similarly, table e2 was partitioned using the "from_id" column as a partition key. Partition map pm2 is generated based on the "to_id" column, because a subsequent join criterial (e2.C2=e3.C1) joins a table with table e2 using "to_id" as the join key. Partition map pm2 indicates, for each value of "to_id," the partitions that a corresponding row, containing that column value, was assigned to.

At step 306, the database server instance 106 partitions one or more remaining tables based on one or more generated partition maps.

Figure 7:
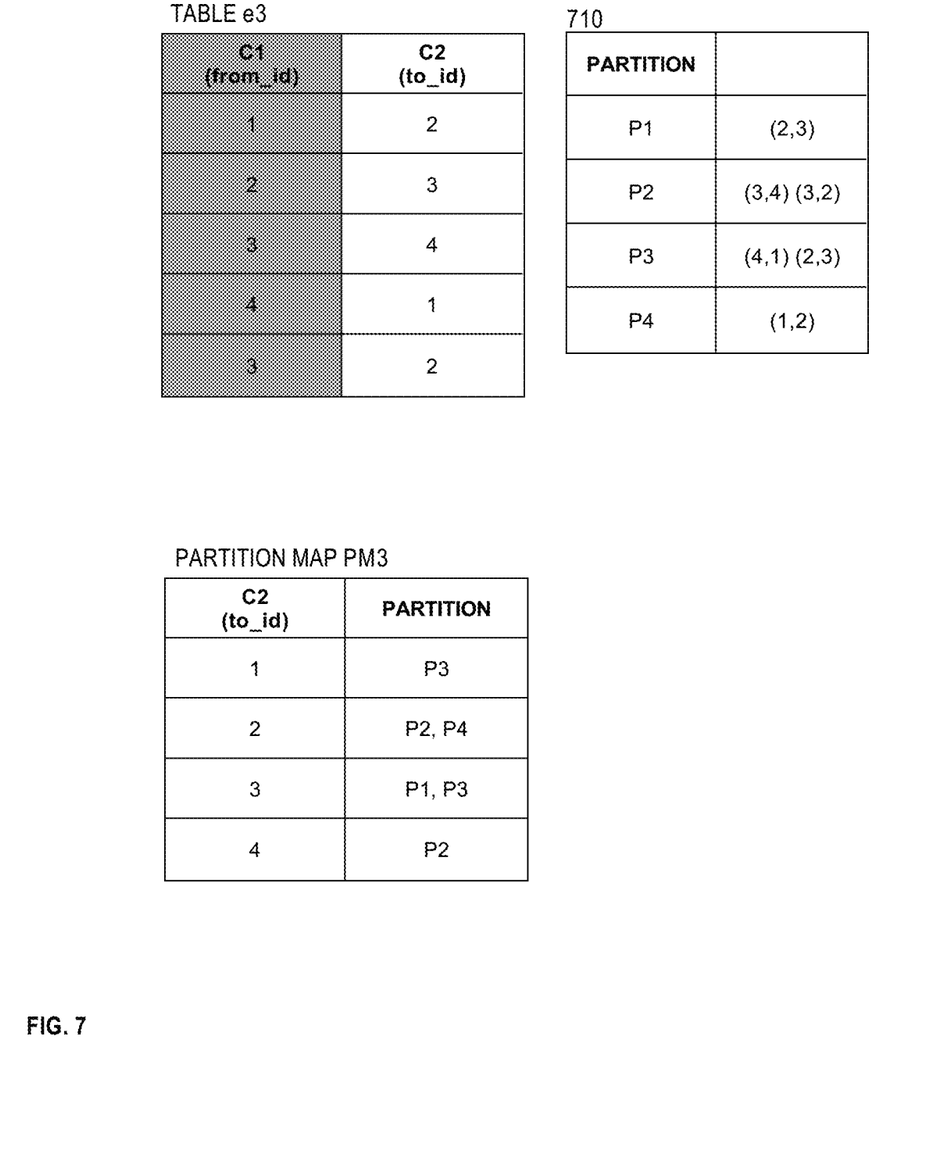
FIG. 7 is a block diagram illustrating the partitions and partition map for a table.

Referring to FIG. 7, it illustrates the partition assignments and partition maps for table e3. Table 710 indicates the rows assigned to each partition, and partition map pm3 is generated for table e3 based on the partitions and values in the "to_id" column.

Table e3 is connected to table e2 in the join criteria, "e2.C2=e3.C1." As described above, partition map pm2 was generated for table e2 based on the "to_id" column (e2.C2) and indicates, for each value of "to_id," which partition corresponding rows were assigned to. Table e3 may be partitioned using "from_id" (e3.C2) as the partition key and based on the mappings indicated by partition map pm2.

In the present example, row (1,2) of table e3 has a value of 1 in the "from_id" column. The value of 1 is used to look up a corresponding partition in partition map pm2. Referring to partition map pm2, a value of 1 in the "to_id" column is mapped to partition p4 so row (1,2) of table e3 is also assigned to partition p4.

A row may be assigned to more than one partition. For example, row (2,3) has a value of 2 in the "from_id" column. Referring to partition map pm2, it indicates that a value of 2 is assigned to both partition p1 and partition p3. Thus, row (2,3) is assigned to both partition p1 and partition p3.

As indicated by table 710, the partitions for table e3 contain the following rows:

P1: (2,3)
P2: (3,4), (3,2)
P3: (2,3), (4,1)
P4: (1,2)

Table e3 is joined to table e4 by the join criteria "e3.C2=e4.C1," so a partition map is also created for table e3 based on the partitioned rows for table e3, using the "to_id" column (e3.C2).

Figure 8:
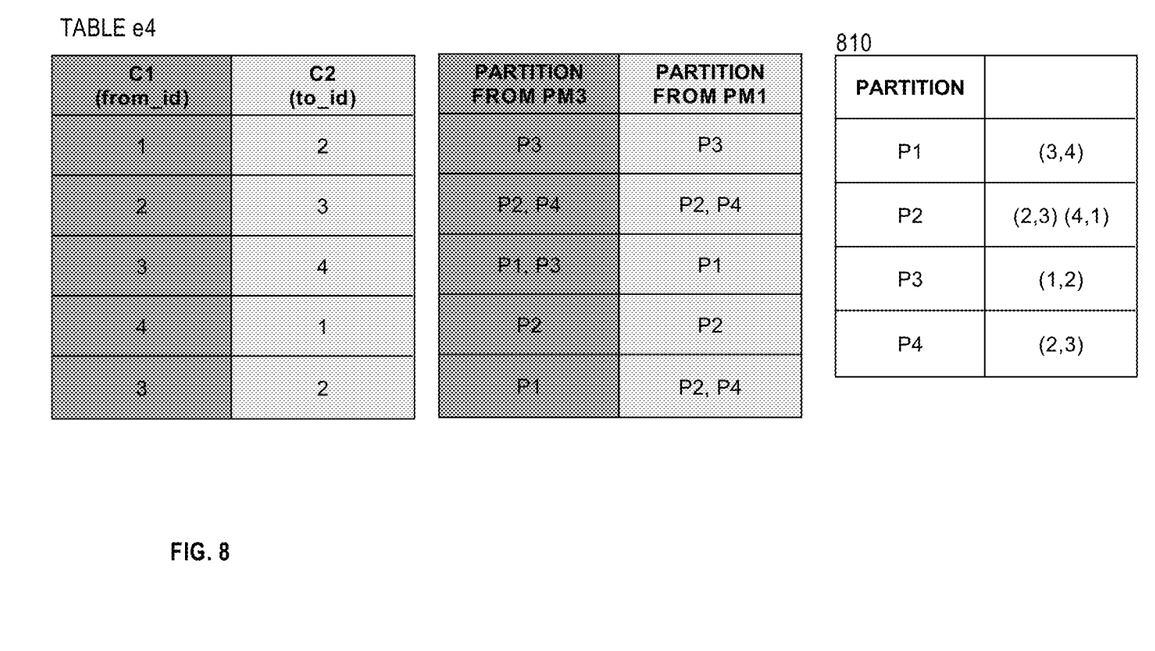
FIG. 8 is a block diagram illustrating the partitions for a table.

Referring to FIG. 8, table 810 illustrates the partition assignments for table e4. Table e4 is connected to table e1 by the join criteria "e4.C2=e1.C1," and to table e3 by the join criteria "e3.C2=e4.C1." Partition map pm1 was already created for table e1 and partition map pm3 was created for table e3. Thus, table e4 is partitioned based on both the "to_id" column (e4.C2), the "from_id" column (e4.C1), as well as both pm1 and pm3.

In an embodiment, partitions may be filtered based on two or more partition maps. If a row would be assigned to a particular partition based on a first partition map, but not assigned to that partition based on a second partition map, then the row is not assigned to the particular partition. That is, an AND operation may be used on a plurality of partition assignments derived from a plurality of partition maps in order to determine partition assignments.

For example, based on partition map pm1, row (1,2) is assigned to partition p3. Based on partition map pm3, row (1,2) is also assigned to partition p3. Since the partition assignments are the same, row (1,2) for table e4 is assigned to partition p3.

In contrast, based on partition map pm1, row (3,4) is assigned to partition p1. However, based on partition map mp3, row (3,4) is assigned to partition p1 and p3. Since only partition p1 is in common, row (3,4) of table 4 is only assigned to partition p1.

If based on the partition maps there are no partitions in common, then the row may be filtered out and not assigned to a partition at all. For example, based on partition map pm1, row (3,2) is assigned to partition p2 and p4. Based on partition map pm3, row (3,2) is assigned to partition p1. Since there are no partitions in common, row (3,2) is not assigned to any partition and is not shown in table 810.

In some embodiments, the rows of the last table in the multi-way join are partitioned but not stored in memory with the other rows in the partitions. Instead, the rows are used directly to find and return the results for the multi-way join. In an embodiment, if the partition is stored on disk, then the rows assigned to that partition are still stored to disk.

At step 308, database server instance 206 determines results for the multi-way join based on the partitions for each table. If some or all of a partition is stored on disk, the partition is read from disk.

If a first table is connected to a second table by a join criteria, then rows of the first table are compared with rows of the second table to determine whether the rows satisfy the join criteria. In an embodiment, only rows that were assigned to the same partitions are compared.

In the present example, partition p1 contains:
For table e1: (4,1)
For table e2: (1,2)
For table e3: (2,3)
For table e4: (3,4)

In an embodiment, hash tables are used to find matching rows in the partitions. Hash tables may be created based on the join criteria in the multi-way join query, and then rows from each table are used to probe the hash table for the corresponding join criteria. Each hash table is created with the corresponding join key as the hash key.

In the present example, three hash tables may be created:
A hash table on e1, for the join criteria "e1.C2=e2.C1" and "e4.C2=e1.C1" with e1.C2 and e1.C1 as keys
A hash table on e2, for the join criteria "e2.C2=e3.C1" with e2.C1 as a key
A hash table on e3, for the join criteria "e3.C2=e4.C1" with e3.C2 as a key In an embodiment, a hash table is created for each partition of each table. Thus, a hash table for partition 1 on table e1 would contain only the rows from table e1 that were assigned to partition 1, a hash table for partition 1 on table e2 would contain only the rows from table e2 that were assigned to partition 1, and so on.

In an embodiment, the rows from the last table are compared with the rows from the preceding table. Rows from the preceding table that satisfy the join criteria may then be used to check any preceding join criteria containing that table, iteratively, until all tables have been checked. For a particular row, if corresponding rows were found in all tables, then the rows may be merged and a result returned.

Table e4 was the last table specified in the multi-way join, so row (3,4) of table e4 is selected first. Row (3,4) is used to check partition p1 for table e3 based on the join criteria "e3.C2=e4.C1." The value 3 would be hashed to probe the hash table for table e3. This returns a result of row (2,3) of table e3. Row (2,3) is used to check partition p1 for table e2 based on the join criteria "e2.C2=e3.C1." The value 2 is used to prove the hash table for table e2. This returns a results of row (1,2) of table e2. Row (1,2) of table e2 and row (3,4) of table e4 are used to check partition p1 for table e1 based on the join criteria "e1.C2=e2.C1" and "e4.C2=e1.C1." Value 4 would be hashed for table e4 and value 1 would be hashed for table e2. Both return a result of row (4,1) of table e1. Since a row was found for all probes, a result was found and may be returned.

Distributed Processing

In some embodiments, a particular query may be received by a single node, but then the work of the query may be distributed to multiple nodes in a cluster. Each row of a table may be assigned and sent to a node for processing the query.

A row may be assigned to a node using a hash function. A hash function may be applied to the values in a column of the row, such as a join key in a join criteria that includes the table. Based on the result of the hash function, the row is assigned to a corresponding node.

In an embodiment, the first two tables in the multi join query are distributed to nodes in a cluster using a hash function. The remaining tables may be distributed based on a distribution map.

A distribution map indicates, for a table, which node each row of the table was sent to. If rows of a table are distributed based to nodes based on a first column, then the distribution map may be created based on a second column and the node assignments, similar to the process described above for creating partition maps. An entry in the distribution map indicates, for a value of a particular column, the node that the corresponding row(s) were assigned to.

In the above example, assume database server instance 206 on node 202 receives the query comprising the multi-way join. Rather than process the multi-way hash join on its own, database server instance 206 divides the work for the multi-way hash join by assigning rows of each table to one or more of nodes 202, 212, 222, and 232. In an embodiment, the work may be further divided between the one or more processors 208, 218, 228, and 238.

Assume applying a hash function to a value of 1 assigns the row to node 202, a value of 2 assigns the row to node 212, a value of 3 assigns the row to node 222, and a value of 4 assigns the row to node 232.

Rows of table e1 may be assigned to nodes based on the join key for the first join criteria. The hash function is applied to the value in the "to_id" column of each row in table e1 to determine which node to send the row to.

Row (1,2) has a value of 2 in the "to_id" column, so row (1,2) is assigned to node 212. Row (2,3) has a value of 3 in the "to_id" column, so row (2,3) is assigned to node 222. Row (3,4) has a value of 4 in the "to_id" column, so row (3,4) is assigned to node 232. Row (4,1) has a value of 1 in the "to_id" column, so row (4,1) is assigned to node 202. Row (3,2) has a value of 2 in the "to_id" column, so row (3,2) is also assigned to node 212.

A distribution map is generated based on the node assignments of the rows of table e1. The distribution map may be based on a join key in a subsequent join criteria, such as the "from_id" column for the join criteria "e4.C2=e1.C1." The distribution map for table e1 would indicate that a "from_id" value of 1 is assigned to node 212, a value of 2 is assigned to node 222, a value of 3 is assigned to nodes 212 and 232, and a value of 4 is assigned to node 202. Similar to partitioning tables as described above, rows of table e4 may be sent to nodes 202, 212, 222, and 232 based on the distribution maps for table e1 and e3.

Each node performs the multi-way hash join for its assigned rows as described above. The nodes may send the results back to the database server instance after they have finished processing the multi-way hash join.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
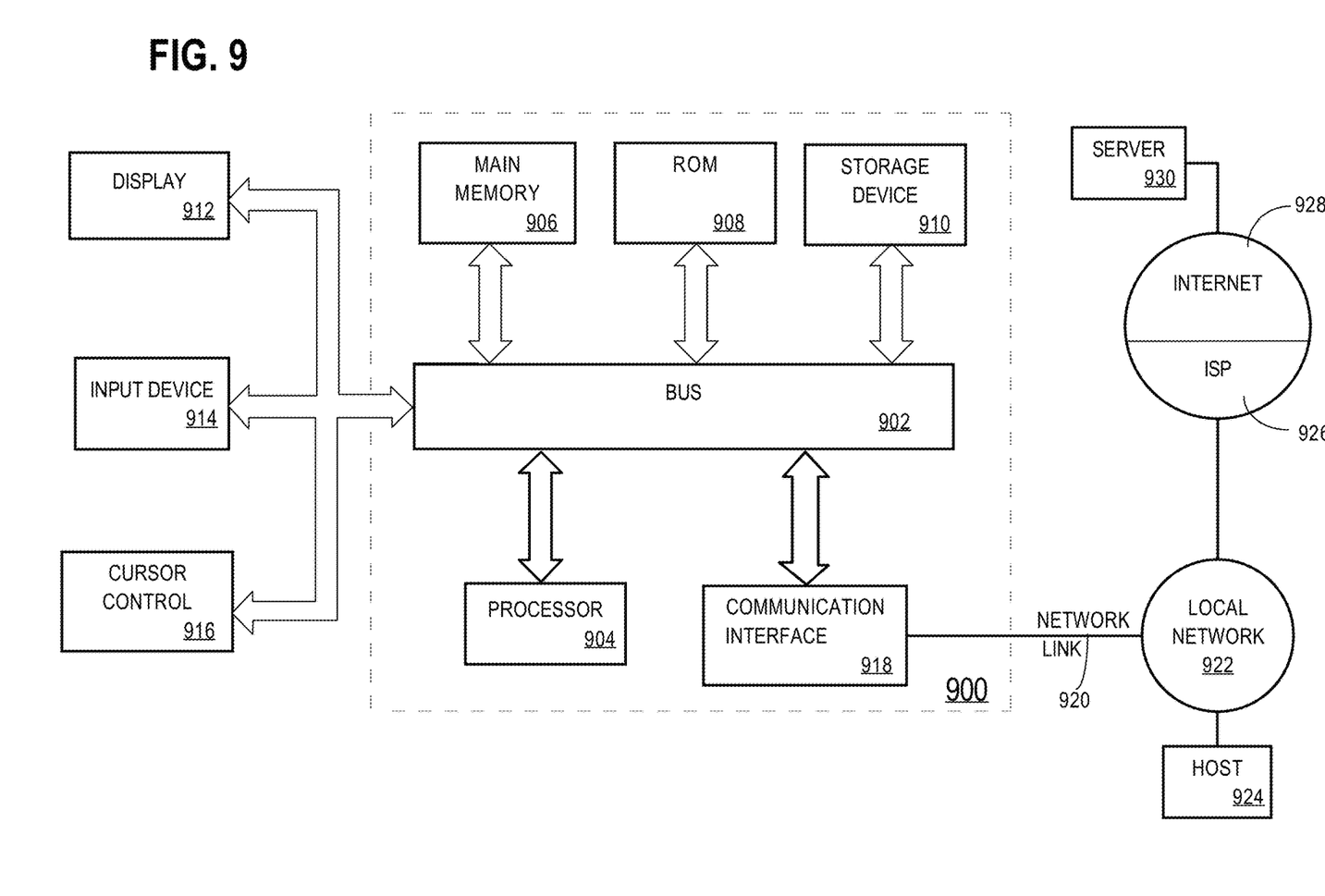
FIG. 9 is a block diagram illustrating a computer system that may be used to implement the techniques described herein.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk, optical disk, or solid-state drive is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 910. Volatile media includes dynamic memory, such as main memory 906. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   receiving, at a database system, a query comprising a multi-way join comprising a plurality of join operations, each join operation of said plurality of join operations involving a respective first join key of a respective first table and a respective second join key of a respective second table;
   wherein the plurality of join operations includes a first join operation, a second join operation, and a third operation;
   for the first join operation:

partitioning the respective first table of the first join operation into a plurality of partitions based on said the respective first join key of said first join operation;

generating a first partition map that maps said plurality of partitions to values contained in a respective first join key of the second join operation, said respective first join key of the second join operation being a column of the respective first table of said first join operation;

partitioning the respective second table of the first join operation into said plurality of partitions based on said the respective second join key of said first join operation;

generating a second partition map that maps said plurality of partitions to values contained in a respective first join key of the third join operation, said respective first join key of the third join operation being a column of the respective second table of said first join operation;

partitioning the respective second table of said second join operation based on the first partition map and the respective second join key of said second join operation;

partitioning the respective second table of the third join operation based on the second partition map and the respective second join key of the third join operation.

2. The method of claim 1, wherein partitioning the respective first table and the respective second table of the first join operation comprises:

applying a hash function to the respective first join key; and applying a hash function to the respective second join key.

3. The method of claim 1 further comprising:

generating a third partition map that maps values contained in a respective second join key of the third join operation, said respective second join key of said third join operation being a column of the respective second table of said second join operation;

partitioning the respective second table of the third join operation based on the second partition map and the third partition map.

4. The method of claim 3 further comprising:

filtering one or more rows of the respective second table of the third join operation based on the second partition map and the third partition map.

5. The method of claim 1 further comprising storing the plurality of partitions in local memory of the database system.

6. The method of claim 5 further comprising storing a particular partition in a disk if the local memory of the database system cannot store the entire partition.

7. The method of claim 1, wherein the database system is a multi-node database system, the method further comprising:

assigning rows of the first respective table and the second respective table of the first join operation to one or more nodes of the multi-node database system;

based on the assignment, generating a distribution map;

based on the distribution map, assigning rows of the first respective table and the second respective table of the second join operation and the third join operation to the one or more nodes in the multi-node database system; and each of the one or more nodes performing the partitioning and generating for tables assigned to the node.

8. The method of claim 7 further comprising storing the plurality of partitions in respective local memory the one or more nodes.

9. The method of claim 8 further comprising storing a particular partition in a shared disk if the respective local memory cannot store the entire partition.

10. The method of claim 1 further comprising determining, based on the plurality of partitions, results for the multi-way join.

11. The method of claim 10 wherein determining results for the multi-way join further comprises:

generating a first hash table based on the respective second table for the first join operation and the respective second join key of the first join operation;

generating a second hash table based on the respective first table of the second join operation and the respective first join key of the second join operation;

wherein determining results is based on the first hash table and the second hash table.

12. One or more non-transitory computer-readable media storing instructions, wherein the instructions include:

instructions which, when executed by one or more hardware processors, cause receiving, at a database system, a query comprising a multi-way join comprising a plurality of join operations, each join operation of said plurality of join operations involving a respective first join key of a respective first table and a respective second join key of a respective second table;

wherein the plurality of join operations includes a first join operation, a second join operation, and a third operation;

instructions which, when executed by one or more hardware processors, cause for the first join operation:

partitioning the respective first table of the first join operation into a plurality of partitions based on said the respective first join key of said first join operation;

generating a first partition map that maps said plurality of partitions to values contained in a respective first join key of the second join operation, said respective first join key of the second join operation being a column of the respective first table of said first join operation;

partitioning the respective second table of the first join operation into said plurality of partitions based on said the respective second join key of said first join operation;

generating a second partition map that maps said plurality of partitions to values contained in a respective first join key of the third join operation, said respective first join key of the third join operation being a column of the respective second table of said first join operation;

instructions which, when executed by one or more hardware processors, cause partitioning the respective second table of said second join operation based on the first partition map and the respective second join key of said second join operation;

instructions which, when executed by one or more hardware processors, cause partitioning the respective second table of the third join operation based on the second partition map and the respective second join key of the third join operation.

13. The one or more non-transitory computer-readable media of claim 12, wherein partitioning the respective first table and the respective second table of the first join operation further comprises:

applying a hash function to the respective first join key; and applying a hash function to the respective second join key.

14. The one or more non-transitory computer-readable media of claim 12, the instructions further including:
   instructions, which when executed by one or more hardware processors, cause generating a third partition map that maps values contained in a respective second join key of the third join operation, said respective second join key of said third join operation being a column of the respective second table of said second join operation;
   instructions, which when executed by one or more hardware processors, cause partitioning the respective second table of the third join operation based on the second partition map and the third partition map.

15. The one or more non-transitory computer-readable media of claim 14, the instructions further including:
   instructions which, when executed by one or more hardware processors, cause filtering one or more rows of the respective second table of the third join operation based on the second partition map and the third partition map.

16. The one or more non-transitory computer-readable media of claim 12 further including instructions which, when executed by one or more hardware processors, cause storing the plurality of partitions in local memory of the database system.

17. The one or more non-transitory computer-readable media of claim 16 further including instructions which, when executed by one or more hardware processors, cause storing a particular partition in a disk if the local memory of the database system cannot store the entire partition.

18. The one or more non-transitory computer-readable media of claim 12, wherein the database system is a multi-node database system, the instructions further including:
   instructions which, when executed by one or more hardware processors, cause assigning rows of the first respective table and the second respective table of the first join operation to one or more nodes the multi-node database system;
   instructions which, when executed by one or more hardware processors, cause based on the assignment, generating a distribution map;
   instructions which, when executed by one or more hardware processors, cause based on the distribution map, assigning rows of the first respective table and the second respective table of the second join operation and the third join operation to the one or more nodes in the multi-node database system; and
   instructions which, when executed by one or more hardware processors, cause each of the one or more nodes performing the partitioning and generating for tables assigned to the node.

19. The one or more non-transitory computer-readable media of claim 18 further including instructions which, when executed by one or more hardware processors, cause storing the plurality of partitions in respective local memory the one or more nodes.

20. The one or more non-transitory computer-readable media of claim 19 further including instructions which, when executed by one or more hardware processors, cause storing a particular partition in a shared disk if the respective local memory cannot store the entire partition.

21. The one or more non-transitory computer-readable media of claim 12 further comprising instructions which, when executed by one or more hardware processors, cause determining, based on the plurality of partitions, results for the multi-way join.

22. The one or more non-transitory computer-readable media of claim 21 wherein determining results for the multi-way join further comprises:
   instructions which, when executed by one or more hardware processors, cause generating a first hash table based on the respective second table for the first join operation and the respective second join key of the first join operation;
   instructions which, when executed by one or more hardware processors, cause generating a second hash table based on the respective first table of the second join operation and the respective first join key of the second join operation;
   wherein determining results is based on the first hash table and the second hash table.

* * * * *